(12) United States Patent
Stanga et al.

(10) Patent No.: US 9,441,054 B2
(45) Date of Patent: *Sep. 13, 2016

(54) VINYLIDENE FLUORIDE COPOLYMERS

(75) Inventors: Milena Stanga, Origgio (IT); Bradley Lane Kent, Woolwich Township, NJ (US); Alessio Marrani, Lecco (IT); Giulio Brinati, Milan (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 146 days.

This patent is subject to a terminal disclaimer.

(21) Appl. No.: 13/995,275

(22) PCT Filed: Dec. 13, 2011

(86) PCT No.: PCT/EP2011/072506
§ 371 (c)(1),
(2), (4) Date: Jun. 18, 2013

(87) PCT Pub. No.: WO2012/084578
PCT Pub. Date: Jun. 28, 2012

(65) Prior Publication Data
US 2013/0264522 A1    Oct. 10, 2013

Related U.S. Application Data

(60) Provisional application No. 61/426,416, filed on Dec. 22, 2010.

(51) Int. Cl.
| | |
|---|---|
| H01M 4/00 | (2006.01) |
| C08F 14/22 | (2006.01) |
| C08F 214/22 | (2006.01) |
| C08J 5/22 | (2006.01) |
| C08L 27/16 | (2006.01) |
| H01M 4/02 | (2006.01) |
| H01M 4/86 | (2006.01) |
| H01M 8/02 | (2016.01) |
| H01M 8/10 | (2016.01) |
| H01M 10/0565 | (2010.01) |

(Continued)

(52) U.S. Cl.
CPC ............ *C08F 14/22* (2013.01); *C08F 214/22* (2013.01); *C08F 214/225* (2013.01); *C08J 5/2237* (2013.01); *C08K 5/06* (2013.01); *C08L 27/16* (2013.01); *C08L 33/02* (2013.01); *H01M 4/02* (2013.01); *H01M 4/8605* (2013.01); *H01M 8/0291* (2013.01); *H01M 8/1023* (2013.01); *H01M 10/0565* (2013.01); *C08J 2327/16* (2013.01); *C08L 2205/02* (2013.01); *C08L 2205/025* (2013.01); *Y02E 60/521* (2013.01); *Y02P 70/56* (2015.11)

(58) Field of Classification Search
CPC ........ C08F 14/22; C08F 214/22; C08F 2/16; C08L 5/06; C08L 27/16; C08L 33/02; C08L 5/22; H01M 4/00

USPC .................. 252/500; 526/255, 209; 521/145; 524/545; 525/199
See application file for complete search history.

(56) References Cited

U.S. PATENT DOCUMENTS

| | | |
|---|---|---|
| 3,080,347 A | 3/1963 | Sandberg et al. |
| 3,194,796 A | 7/1965 | Squire |

(Continued)

FOREIGN PATENT DOCUMENTS

| | | |
|---|---|---|
| CA | 786877 A | 6/1968 |
| EP | 0148482 B1 | 3/1992 |

(Continued)

OTHER PUBLICATIONS

Pianca, M., et al—"End groups in fluoropolymers", 1999, Journal of Fluorine Chemistry, vol. 95, Elsevier Science S.A., pp. 71-84; 14 pgs.

(Continued)

*Primary Examiner* — Douglas Mc Ginty

(57) ABSTRACT

The present invention pertains to a fluoropolymer [polymer (F)] comprising:
  recurring units derived from vinylidene fluoride (VDF), and
  from 0.01% to 5% by moles of recurring units derived from at least one (meth)acrylic monomer [monomer (MA)] having formula (I) here below:

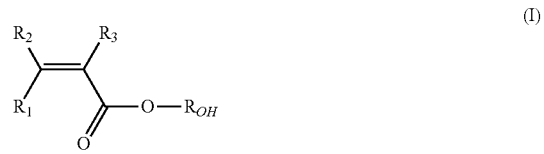

wherein:
  $R_1$, $R_2$ and $R_3$, equal to or different from each other, are independently selected from a hydrogen atom and a $C_1$-$C_3$ hydrocarbon group, and
  $R_{OH}$ represents a hydrogen atom or a $C_1$-$C_5$ hydrocarbon moiety comprising at least one hydroxyl group,
said polymer (F) comprising end groups having formula —$CF_2H$ and/or —$CF_2CH_3$ in an amount of at least 30 mmoles per Kg of vinylidene fluoride (VDF) recurring units.
The invention also pertains to a process for the manufacture of said polymer (F) and to use of said polymer (F) as binders for the manufacture of electrodes or for the manufacture of membranes.

15 Claims, No Drawings

(51) Int. Cl.
*C08K 5/06* (2006.01)
*C08L 33/02* (2006.01)

(56) References Cited

U.S. PATENT DOCUMENTS

| | | |
|---|---|---|
| 3,242,218 A | 3/1966 | Miller |
| 3,318,850 A | 5/1967 | Stilmar |
| 3,665,041 A | 5/1972 | Sianesi et al. |
| 3,715,378 A | 2/1973 | Sianesi et al. |
| 4,523,039 A | 6/1985 | Lagow et al. |
| 4,611,260 A | 9/1986 | Bauer |
| 4,684,337 A | 8/1987 | Bauer |
| 4,861,851 A | 8/1989 | Miyabayashi et al. |
| 4,990,283 A | 2/1991 | Visca et al. |
| 5,087,679 A | 2/1992 | Inukai et al. |
| 5,095,072 A | 3/1992 | Kobayashi et al. |
| 5,278,694 A | 1/1994 | Wheatley et al. |
| 5,334,333 A | 8/1994 | Goetz |
| 5,447,982 A | 9/1995 | Kamba et al. |
| 5,498,680 A | 3/1996 | Abusleme et al. |
| 6,103,843 A | 8/2000 | Abusleme et al. |
| 6,228,533 B1 | 5/2001 | Ohashi et al. |
| 6,355,749 B1 | 3/2002 | Chung et al. |
| 6,730,762 B2 | 5/2004 | Lousenberg et al. |
| 6,780,363 B2 * | 8/2004 | Palamone et al. ............ 264/219 |
| 6,780,966 B2 | 8/2004 | Wu et al. |
| 6,790,932 B2 | 9/2004 | Kapeliouchko et al. |
| 6,803,419 B2 | 10/2004 | Tsuda et al. |
| 6,872,503 B2 | 3/2005 | Wheland et al. |
| 7,101,925 B2 | 9/2006 | Malvasi et al. |
| 7,101,944 B2 | 9/2006 | Rajagopalan |
| 7,122,608 B1 | 10/2006 | Brinati et al. |
| 7,615,600 B2 | 11/2009 | Capron et al. |
| 2002/0197536 A1 | 12/2002 | Mori et al. |
| 2006/0235175 A1 | 10/2006 | Baradie et al. |
| 2007/0149694 A1 | 6/2007 | Krishnan |
| 2007/0244262 A1 | 10/2007 | Zhang et al. |
| 2008/0171804 A1 | 7/2008 | Krishnan |
| 2008/0182125 A1 | 7/2008 | Krishnan et al. |
| 2008/0233062 A1 | 9/2008 | Krishnan |
| 2009/0274912 A1 | 11/2009 | Bonnet |
| 2010/0255378 A1 | 10/2010 | Bonnet et al. |
| 2013/0296512 A1* | 11/2013 | Marrani et al. ............... 526/209 |
| 2014/0154573 A1* | 6/2014 | Stanga ................ C09D 127/16 429/217 |

FOREIGN PATENT DOCUMENTS

| | | |
|---|---|---|
| EP | 0601754 A1 | 6/1994 |
| EP | 1452551 A1 | 9/2004 |
| EP | 1621573 A1 | 2/2006 |
| EP | 2133370 A1 | 12/2009 |
| FR | 2890971 A1 | 3/2007 |
| GB | 1226566 A | 3/1971 |
| JP | 57-137308 A | 8/1982 |
| JP | 58-095753 A | 6/1983 |
| WO | WO 8700538 A1 | 1/1987 |
| WO | WO 2008017789 A2 | 2/2008 |
| WO | WO 2008041998 A1 | 4/2008 |
| WO | WO 2008079986 A1 | 7/2008 |
| WO | WO 2008129041 A1 | 10/2008 |
| WO | WO 2009147030 A1 | 12/2009 |
| WO | WO 2012084579 A1 | 6/2012 |

OTHER PUBLICATIONS

Kochnev, I. G., et al—"Change in the surface properties of Ftorlons by the radiation grafting of methacrylic acid", 1973, Plasticheskie Massy, vol. 8, pp. 12-13, 3 pgs, Includes abstract in English.

Petersohn, E., et al—"Characterization of radiation grafted PVDF and P(VDF/TrFE) films", 1993, Thin Films, Proc. Jt. 4th Int. Symp. Trends New Appl. Thin Films 11th Conf. High Vac., Interfaces Thin Films. Editor(s): Hecht, G.; Richter, F.; Hahn, J. Publisher: DGM Informationsges., Oberursel, Germany; pp. 650-653; 4 pgs.

Petersohn, E., et al—"Modification of phase transitions in swift heavy ion irradiated and MMA-grafted ferroelectric fluoropolymers", 1995, Nuclear Instruments & Methods in Physics Research, Section B: Beam Interactions with Materials and Atoms, vol. 105, Issue Nos. 1-4, Elsevier Science BV pp. 267-274; 8 pgs.

Kimura, T., et al—"Preparation of Poly(vinylidene fluoride-co-trifluoroethylene) Film with a Hydrophilic Surface by Direct Surface-initiated Atom Transfer Radical Polymerization without Pretreatment", 2009, Chemistry Letters, vol. 38, Issue No. 5, The Chemical Society of Japan, pp. 446-447; 2 pgs.

Green, J., et al—"Nitroso Rubber Research, Development and Production", 1965, Defense Documentation Center for Scientific and Technical Information, Cameron Station Alexandria, VA, AD463777 (unclassified), Feb. 28, 1965, Thiokol Chemical Corp Denville, NJ Reaction Motors Div; pp. 1-22; 30 pgs.

Zhang, H., et al—"Microstructure and electromechanical responses in semicrystalline ferroelectric relaxor polymer blends", 2006, Journal of Applied Physics, vol. 100.044113, pp. 044113-1 thru 044113-7, doi:10.1063/1.2335778—American Institute of Physics; 7 pgs.

Omote, K., et al—"Shear piezoelectric properties of vinylidene fluoride trifluoroethylene copolymer, and its application to transverse ultrasonic transducers", 1995, Appl. Phys. Letters, vol. 66, Issue No. 17, pp. 2215-2217—doi:10.1063/1.113171—American Institute of Physics; 3 pgs.

Reynolds, J.R.—"Polymer Films with Enhanced Dielectric Properties. Final Report", 1993, U.S. Army Research Office, DAAL03-90-G-0149, University of Florida, Defense Technical Information Centre—ADA271148, Jul. 26, 1993, Approved for publish release, 10 pgs.

Isner-Brom, P., et al—"Intrinsic Piezoelectric Characterization of PVDF Copolymers: Determination of Elastic Constants", 1995, Ferroelectrics, vol. 171, pp. 271-279—Overseas Publishers Association, Amsterdam B.V., Published under license by Gordon and Breach Science Publishers SA.; 9 pgs.

Bauer, F., et al—"Very high pressure behavior of precisely-poled PVDF", Ferroelectrics, 1995, vol. 171, pp. 95-102—Overseas Publishers Association, Amsterdam B.V., Published under license by Gordon and Breach Science Publishers SA ; 8 pgs.

U.S. Appl. No. 13/996,018, Alessio Marrani, et al.

* cited by examiner

VINYLIDENE FLUORIDE COPOLYMERS

CROSS-REFERENCE TO RELATED APPLICATIONS

This application is a U.S. national stage entry under 35 U.S.C. §371 of International Application No. PCT/EP2011/072506 filed Dec. 13, 2011, which claims priority to U.S. provisional application No. 61/426,416 filed on Dec. 22, 2010, the whole content of this application being incorporated herein by reference for all purposes.

TECHNICAL FIELD

The present invention relates to vinylidene fluoride copolymers and compositions thereof, to a process for the manufacture of said copolymers and to use of said copolymers as binders for the manufacture of electrodes or for the manufacture of membranes.

BACKGROUND ART

Vinylidene fluoride copolymers comprising recurring units derived from (meth)acrylic monomers are known in the art for being endowed with suitable hydrophilic properties and enhanced adhesion towards metals other than chemical inertness and mechanical properties typical of the vinylidene fluoride homopolymers.

Due also to their well-known electrochemical stability, high crystallinity and melting point, chemical resistance in electrolytes and solubility in few selected solvents, vinylidene fluoride copolymers comprising recurring units derived from (meth)acrylic monomers have been thus found to be suitable for the manufacture of electrodes and membranes which are typically shaped by processing solutions of said copolymers in suitable organic solvents.

In particular, EP 1621573 A (KUREHA CORPORATION) 1 Feb. 2006 discloses porous membranes of vinylidene fluoride copolymers comprising from 0.01% to 10% by moles of hydrophilic monomer units having at least one group selected from epoxy, hydroxyl, carboxy, ester, amide and acid anhydride groups, said membranes being obtained by melt-extruding compositions of said copolymers comprising well-defined amounts of suitable organic solvents and plasticizers.

Vinylidene fluoride copolymers comprising recurring units derived from (meth)acrylic monomers are also known in the art which, due to random distribution of (meth)acrylic monomers within the polyvinylidene fluoride backbone of the fluorocopolymer, advantageously maximize the effects of the modifying (meth)acrylic monomer on both the adhesiveness and/or the hydrophylic behaviour of the resulting copolymer, even at low levels of (meth)acrylic monomer in the composition, without impairing the other outstanding properties of the vinylidene fluoride polymers, e.g. thermal stability and mechanical properties.

For instance, WO 2008/129041 (SOLVAY SOLEXIS S.P.A.) 30 Oct. 2008 discloses linear semi-crystalline copolymers of vinylidene fluoride comprising from 0.05% to 10% by moles of recurring units derived from (meth)acrylic monomers, said copolymers having a random distribution of the recurring units derived from hydrophilic (meth)acrylic monomers throughout the whole vinylidene fluoride backbone, and use thereof as binders, especially for forming electrodes of Lithium batteries and/or electric double layer capacitors, or for the manufacture of hydrophilic membranes.

However, among major issues affecting solution processing of the vinylidene fluoride copolymers of the prior art, mention can be notably made of poor dissolution properties of said copolymers in common organic solvents, so that long dissolution times are typically required at low temperatures for obtaining uniform and stable solutions of these copolymers at concentrations suitable for preparing electrodes and membranes.

It would thus be desirable to find alternative vinylidene fluoride copolymers which advantageously offer increased dissolution properties in suitable organic solvents, while maintaining good thermal stability properties.

SUMMARY OF INVENTION

It is thus an object of the present invention a fluoropolymer [polymer (F)] comprising:
  recurring units derived from vinylidene fluoride (VDF), and
  from 0.01% to 5% by moles of recurring units derived from at least one (meth)acrylic monomer [monomer (MA)] having formula (I) here below:

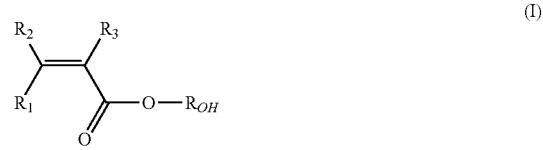

wherein:
  $R_1$, $R_2$ and $R_3$, equal to or different from each other, are independently selected from a hydrogen atom and a $C_1$-$C_3$ hydrocarbon group, and
  $R_{OH}$ represents a hydrogen atom or a $C_1$-$C_5$ hydrocarbon moiety comprising at least one hydroxyl group, said polymer (F) comprising end groups having formula —$CF_2H$ and/or —$CF_2CH_3$ in an amount of at least 30 mmoles per Kg of vinylidene fluoride (VDF) recurring units.

The Applicant has found that the polymer (F) of the invention advantageously exhibits, even at low levels of (meth)acrylic monomer (MA) in the composition, enhanced dissolution properties while retaining good thermal properties to be advantageously used as binders for the manufacture of electrodes or for the manufacture of membranes.

It is essential that the polymer (F) of the invention comprises both said level of (meth)acrylic monomer (MA) and at least 30 mmoles, preferably at least 40 mmoles, more preferably at least 60 mmoles of end groups having formulae —$CF_2H$ and/or —$CF_2CH_3$ per Kg of VDF recurring units so that the polymer (F) advantageously exhibits improved dissolution properties.

When the polymer (F) of the invention comprises less than 30 mmoles of end groups having formulae —$CF_2H$ and/or —$CF_2CH_3$ per Kg of VDF recurring units, the polymer (F) is not endowed with adequate dissolution properties.

The (meth)acrylic monomer [monomer (MA)] preferably complies with formula (II) here below:

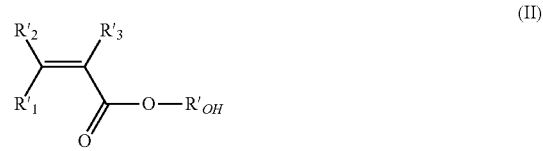

wherein:

R'$_1$ and R'$_2$, equal to or different from each other, are independently selected from a hydrogen atom and a C$_1$-C$_3$ hydrocarbon group, preferably R'$_1$ and R'$_2$ being hydrogen atoms, R'$_3$ is a hydrogen atom, and R'$_{OH}$ represents a hydrogen atom or a C$_1$-C$_5$ hydrocarbon moiety comprising at least one hydroxyl group.

Non-limitative examples of (meth)acrylic monomers (MA) notably include acrylic acid, methacrylic acid, hydroxyethyl(meth)acrylate, hydroxypropyl(meth)acrylate, hydroxyethylhexyl(meth)acrylate.

The monomer (MA) is more preferably selected from the followings:

hydroxyethylacrylate (HEA) of formula:

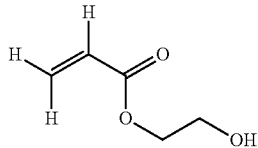

2-hydroxypropyl acrylate (HPA) of either of formulae:

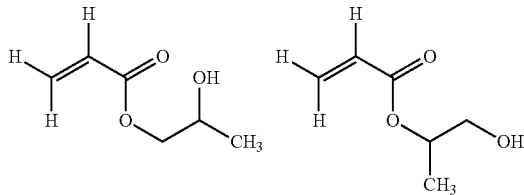

acrylic acid (AA) of formula:

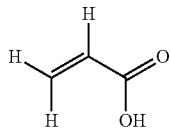

and mixtures thereof.

The monomer (MA) is even more preferably acrylic acid (AA) or hydroxyethylacrylate (HEA).

The polymer (F) of the invention comprises preferably at least 0.02% by moles, more preferably at least 0.03% by moles, even more preferably at least 0.04% by moles of recurring units derived from at least one (meth)acrylic monomer (MA) having formula (I) as described above.

The polymer (F) of the invention comprises preferably at most 1% by moles, more preferably at most 0.8% by moles, even more preferably at most 0.6% by moles of recurring units derived from at least one (meth)acrylic monomer (MA) having formula (I) as described above.

The polymer (F) of the invention may further comprise recurring units derived from one or more other fluorinated comonomers [comonomer (F)].

The term "fluorinated comonomer [comonomer (F)]" is hereby intended to denote an ethylenically unsaturated comonomer comprising at least one fluorine atom.

The comonomer (F) may further comprise one or more other halogen atoms selected from chlorine, bromine and iodine atoms.

Non-limitative examples of suitable comonomers (F) notably include the followings:

(i) C$_2$-C$_8$ perfluoroolefins such as tetrafluoroethylene (TFE);

(ii) perfluoroalkylethylenes of formula CH$_2$=CH—R$_{f0}$, wherein R$_{f0}$ is a C$_2$-C$_6$ perfluoroalkyl group;

(iii) chloro- and/or bromo- and/or iodo-C$_2$-C$_6$ fluoroolefins such as chlorotrifluoroethylene (CTFE);

(iv) perfluoroalkylvinylethers of formula CF$_2$=CFOR$_{f1}$, wherein R$_{f1}$ is a C$_1$-C$_6$ perfluoroalkyl group, such as perfluoromethylvinylether (PMVE) and perfluoropropylvinylether (PPVE);

(v) (per)fluorooxyalkylvinylethers of formula CF$_2$=CFOX$_0$, wherein X$_0$ is a C$_1$-C$_{12}$ oxyalkyl group or a C$_1$-C$_{12}$ (per)fluorooxyalkyl group having one or more ether groups, e.g. perfluoro-2-propoxy-propyl group;

(vi) (per)fluoroalkylvinylethers of formula CF$_2$=CFOCF$_2$OR$_{f2}$, wherein R$_{f2}$ is a C$_1$-C$_6$ (per)fluoroalkyl group, e.g. —CF$_3$, —C$_2$F$_6$, —C$_3$F$_7$, or a C$_1$-C$_6$ (per)fluorooxyalkyl group having one or more ether groups, e.g. —C$_2$F$_6$—O—CF$_3$;

(vii) functional (per)fluorooxyalkylvinylethers of formula CF$_2$=CFOY$_0$, wherein Y$_0$ is selected from a C$_1$-C$_{12}$ alkyl group or (per)fluoroalkyl group, a C$_1$-C$_{12}$ oxyalkyl group and a C$_1$-C$_{12}$ (per)fluorooxyalkyl group having one or more ether groups, Y$_0$ comprising a carboxylic or sulfonic acid group, in its acid, acid halide or salt form;

(viii) fluorodioxoles, preferably perfluorodioxoles.

The comonomer (F) is preferably free of hydrogen atoms.

Most preferred fluorinated comonomers (F) are trifluoroethylene (TrFE), chlorotrifluoroethylene (CTFE), perfluoromethylvinylether (PMVE), tetrafluoroethylene (TFE).

Should the fluorinated comonomer (F) be present, the polymer (F) of the invention comprises typically from 2% to 45% by moles, preferably from 3% to 40% by moles, more preferably from 4% to 35% by moles of recurring units derived from said fluorinated comonomer (F).

The polymer (F) of the invention may be semi-crystalline or amorphous.

The term "semi-crystalline" is hereby intended to denote a polymer having a heat of fusion of from 10 to 90 J/g, preferably of from 30 to 60 J/g, more preferably of from 35 to 55 J/g as measured according to ASTM D3418-08.

The term "amorphous" is hereby to denote a polymer having a heat of fusion of less than 5 J/g, preferably of less than 3 J/g, more preferably of less than 2 J/g as measured according to ASTM D-3418-08.

The polymer (F) of the invention has a melt flow index (MFI) of advantageously 0.5 to 100 g/10 min, preferably of 1 to 50 g/10 min, more preferably of 2 to 30 g/10 as measured according to ASTM D1238 (230° C., 5 Kg).

Another object of the present invention is a process for the manufacture of the polymer (F) as defined above, said process comprising polymerizing vinylidene fluoride (VDF), at least one (meth)acrylic monomer (MA) having formula (I) as described above and, optionally, one or more other fluorinated comonomers (F) as defined above in the presence of at least one radical initiator in a polymerization medium comprising:

water;

at least one fluorinated surfactant [surfactant (FS)];

at least one non-functional perfluoropolyether (PFPE) oil.

The polymerization process of the invention is typically an aqueous emulsion polymerization process advantageously yielding homogeneously dispersed nano-sized droplets in a kinetically stable, optically transparent, isotropic aqueous composition, at room temperature, stabilized by an interfacial film of fluorinated surfactant (FS) molecules.

The Applicant has found that the polymerization process of the present invention is particularly suitable for manufacturing the polymer (F) of the invention, as it enables achieving suitable polymerization rates at limited overall pressure.

Polymerization pressure ranges typically between 20 and 70 bar, preferably between 25 and 65 bar.

The skilled in the art will choose the polymerization temperature having regards, inter alia, of the radical initiator used. Polymerization temperature is generally selected in the range comprised between 60° C. and 135° C., preferably between 90° C. and 130° C.

While the choice of the radical initiator is not particularly limited, it is understood that those suitable for the process according to the invention are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis(2,4-dimethylvaleronitrile); tert-butylazo-2-cyanobutane; dibenzoylperoxide; tert-butylper-2-ethylhexanoate; tert-butylpermaleate; 2,2'-azobis(isobutyronitrile); bis(tert-butyl peroxy)cyclohexane; tert-butyl-peroxyisopropylcarbonate; tert-butylperacetate; 2,2'-bis(tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, $[CF_3CF_2CF_2OCF(CF_3)COO]_2$, perfluoropropionyl peroxides, $(CF_3CF_2CF_2COO)_2$, $(CF_3CF_2COO)_2$, $\{(CF_3CF_2CF_2)-[CF(CF_3) \quad CF_2O]_m-CF(CF_3)-COO\}_2$ where m=0-8, $[ClCF_2(CF_2)_nCOO]_2$, and $[HCF_2 \, (CF_2)_n COO]_2$ where n=0-8; perfluoroalkyl azo compounds such as perfluoroazoisopropane, $[(CF_3)_2CFN=]_2$, $R^□N=NR^□$, where $R^□$ is a linear or branched perfluorocarbon group having 1-8 carbons; stable or hindered perfluoroalkane radicals such as hexafluoropropylene trimer radical, $[(CF_3)_2 CF]_2 \, (CF_2CF_2)C$. radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Organic radical initiators as defined above are preferred. Among them, the peroxides having a self-accelerating decomposition temperature (SADT) higher than 50° C. are particularly preferred, such as for instance: di-tert-butyl peroxide (DTBP), diterbutylperoxyisopropylcarbonate, tert-butyl(2-ethyl-hexyl)peroxycarbonate, tertbutylperoxy-3,5,5-trimethylhexanoate.

According to an embodiment of the process of the invention, a mixture of one or more organic radical initiators as defined above and one or more inorganic radical initiators as defined above, preferably ammonium persulfate, is advantageously used to accelerate the polymerization process.

The radical initiator is added to the polymerization medium in an amount ranging advantageously from 0.001% to 20% by weight based on the weight of the polymerization medium as defined above.

The polymerization process of the invention is typically carried out in the presence of a chain transfer agent. The chain transfer agent is generally selected from those known in the polymerization of fluorinated monomers such as ketones, esters, ethers or aliphatic alcohols having from 3 to 10 carbon atoms like, e.g., acetone, ethylacetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl)carbonate, bis(isobutyl)carbonate. The chain transfer agent may be fed to the polymerization medium at the beginning, continuously or in discrete amounts (step-wise) during the polymerization, continuous or stepwise feeding being preferred.

Emulsion polymerization process as detailed above have been described in the art (see e.g. U.S. Pat. No. 4,990,283 (AUSIMONT SPA (IT)) 5 Feb. 1991, U.S. Pat. No. 5,498,680 (AUSIMONT SPA) 12 Mar. 1996 and U.S. Pat. No. 6,103,843 (AUSIMONT SPA) 15 Aug. 2000).

By "non-functional perfluoropolyether (PFPE) oil" it is hereby intended to denote a perfluoropolyether (PFPE) oil comprising non-functional end-groups.

The non-functional end groups of the perfluoropolyether (PFPE) oil are generally selected from fluoro(halo)alkyls having 1 to 3 carbon atoms, optionally comprising one or more halogen atoms different from fluorine or hydrogen atoms, e.g. $CF_3-$, $C_2F_5-$, $C_3F_6-$, $ClCF_2CF(CF_3)-$, $CF_3CFClCF_2-$, $ClCF_2CF_2-$, $ClCF_2-$.

The non-functional PFPE oil used in the process of the invention typically comprises a (per)fluoropolyoxyalkylene chain [chain ($R_f$)] comprising recurring units, equal to or different from each other, having general formula $-(CJJ')_j-CKK'-O-$, wherein J and J', equal to or different from each other, independently represent a fluorine atom or a $C_1-C_6$ (per)fluoro(oxy)alkyl group, K and K', equal to or different from each other, independently represent a hydrogen atom, a fluorine atom, a chlorine atom or a $C_1-C_6$ (per)fluoro(oxy)alkyl group and j is an integer comprised between 0 and 3, said recurring units being generally statistically distributed along the (per)fluoropolyoxyalkylene chain [chain ($R_f$)].

The non-functional PFPE oil used in the process of the invention has a number average molecular weight advantageously comprised between 400 and 3000, preferably between 600 and 1500.

The non-functional PFPE oil is preferably selected from the followings:

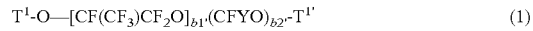
$T^1-O-[CF(CF_3)CF_2O]_{b1'}(CFYO)_{b2'}-T^{1'}$     (1)

wherein:
$T^1$ and $T^{1'}$, equal to or different from each other, are independently selected from $-CF_3$, $-C_2F_5$ and $-C_3F_7$ groups;
Y, equal or different at each occurrence, is selected from a fluorine atom and a $-CF_3$ group;
b1' and b2', equal to or different from each other, are independently integers ≥0 such that the b1'/b2' ratio is comprised between 20 and 1000 and the (b1'+b2') sum is comprised between 5 and 250; should b1' and b2' be both different from zero, the different recurring units are generally statistically distributed along the perfluoropolyoxyalkylene chain.

Said products can be obtained by photooxidation of $C_3F_6$ as described in CA 786877 (MONTEDISON S.P.A.) 4 Jun. 1968 and by subsequent conversion of the end groups as described in GB 1226566 (MONTECATINI EDISON S.P.A.) 31 Mar. 1971.

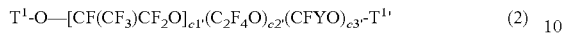

wherein:
$T^1$ and $T^{1'}$, equal to or different from each other, have the same meaning as defined above;
Y, equal or different at each occurrence, has the same meaning as defined above;
c1', c2' and c3', equal to or different from each other, are independently integers ≥0 such that the (c1'+c2'+c3') sum is comprised between 5 and 250; should at least two of c1', c2' and c3' be different from zero, the different recurring units are generally statistically distributed along the perfluoropolyoxyalkylene chain.

Said products can be manufactured by photooxidation of a mixture of $C_3F_6$ and $C_2F_4$ and subsequent treatment with fluorine as described in U.S. Pat. No. 3,665,041 (MONTECATINI EDISON S.P.A.) 23 May 1972.

wherein:
$T^1$ and $T^{1'}$, equal to or different from each other, have the same meaning as defined above;
d1' and d2', equal to or different from each other, are independently integers ≥0 such that the d1'/d2' ratio is comprised between 0.1 and 5 and the (d1'+d2') sum is comprised between 5 and 250; should d1' and d2' be both different from zero, the different recurring units are generally statistically distributed along the perfluoropolyoxyalkylene chain.

Said products can be produced by photooxidation of $C_2F_4$ as reported in U.S. Pat. No. 3,715,378 (MONTECATINI EDISON S.P.A.) 6 Feb. 1973 and subsequent treatment with fluorine as described in U.S. Pat. No. 3,665,041 (MONTECATINI EDISON S.P.A.) 23 May 1972.

wherein:
$T^2$ and $T^{2'}$, equal to or different from each other, are independently selected from —$C_2F_5$ and —$C_3F_7$ groups;
e' is an integer comprised between 5 and 250.

Said products can be prepared by ionic hexafluoropropylene epoxide oligomerization and subsequent treatment with fluorine as described in U.S. Pat. No. 3,242,218 (E. I. DU PONT DE NEMOURS AND CO.) 22 Mar. 1966.

wherein:
$T^2$ and $T^{2'}$, equal to or different from each other, have the same meaning as defined above;
f' is an integer comprised between 5 and 250.

Said products can be obtained by a method comprising fluorinating a polyethyleneoxide, e.g. with elemental fluorine, and optionally thermally fragmentating the so-obtained fluorinated polyethyleneoxide as reported in U.S. Pat. No. 4,523,039 (THE UNIVERSITY OF TEXAS) 11 Jun. 1985.

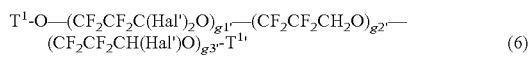

wherein:
$T^1$ and $T^{1'}$, equal to or different from each other, have the same meaning as defined above;
Hal', equal or different at each occurrence, is a halogen selected from fluorine and chlorine atoms, preferably a fluorine atom;
g2', and g3', equal to or different from each other, are independently integers ≥0 such that the (g1'+g2'+g3') sum is comprised between 5 and 250; should at least two of g1', g2' and g3' be different from zero, the different recurring units are generally statistically distributed along the (per)fluoropolyoxyalkylene chain.

Said products may be prepared by ring-opening polymerizing 2,2,3,3-tetrafluorooxethane in the presence of a polymerization initiator to give a polyether comprising repeating units of the formula: —$CH_2CF_2CF_2O$—, and optionally fluorinating and/or chlorinating said polyether, as detailed in EP 148482 B (DAIKIN INDUSTRIES LTD.) 25 Mar. 1992.

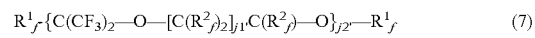

wherein:
$R^1_f$, equal or different at each occurrence, is a $C_1$-$C_6$ perfluoroalkyl group;
$R^2_f$, equal or different at each occurrence, is selected from a fluorine atom and a $C_1$-$C_6$ perfluoroalkyl group;
j1' is equal to 1 or 2;
j2' is an integer comprised between 5 and 250.

Said products can be produced by the copolymerization of hexafluoroacetone with an oxygen-containing cyclic comonomer selected from ethylene oxide, propylene oxide, epoxy-butane and/or trimethylene oxide (oxethane) or substituted derivatives thereof and subsequent perfluorination of the resulting copolymer, as detailed in patent application WO 87/00538 (LAGOW ET AL.) 29 Jan. 1987.

The non-functional PFPE oil is more preferably selected from the followings:
(1') non-functional PFPE oils commercially available from Solvay Solexis S.p.A. under the trademark names GALDEN® and FOMBLIN®, said PFPE oils generally comprising at least one PFPE oil complying with either of formulae here below:

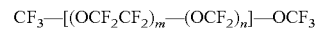

m+n=40-180; m/n=0.5-2

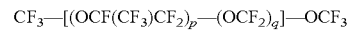

p+q=8-45; p/q=20-1000
(2') non-functional PFPE oils commercially available from Daikin under the trademark name DEMNUM®, said PFPEs generally comprising at least one PFPE complying with formula here below:

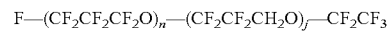

j=0 or integer >0; n+j=10-150
(3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

n=10-60
The non-functional PFPE oil is even more preferably selected from those having formula (1') as described above.

The surfactant (FS) typically complies with formula (III) here below:

$$R_{fs}(X^-)_k(M^+)_k \quad\quad\quad (III)$$

wherein:
- $R_{fs}$ is selected from a $C_5$-$C_{16}$ (per)fluoroalkyl chain, optionally comprising one or more catenary or non-catenary oxygen atoms, and a (per)fluoropolyoxyalkyl chain,
- $X^-$ is selected from $-COO^-$, $-PO_3^-$ and $-SO_3^-$,
- $M^+$ is selected from $NH_4^+$ and an alkaline metal ion, and
- k is 1 or 2.

Non-limitative examples of surfactants (FS) suitable for the process of the invention notably include the followings:

(a) $CF_3(CF_2)_{n0}COOM'$, wherein no is an integer ranging from 4 to 10, preferably from 5 to 7, preferably $n_1$ being equal to 6, and M' represents $NH_4$, Na, Li or K, preferably $NH_4$;

(b) $T-(C_3F_6O)_{n1}(CFXO)_{m1}CF_2COOM''$, wherein T represents a Cl atom or a perfluoroalkoxyde group of formula $C_xF_{2x+1-x'}Cl_{x'}O$, wherein x is an integer ranging from 1 to 3 and x' is 0 or 1, $n_1$ is an integer ranging from 1 to 6, $m_1$ is an integer ranging from 0 to 6, M'' represents $NH_4$, Na, Li or K and X represents F or $-CF_3$;

(c) $F-(CF_2CF_2)_{n2}-CH_2-CH_2-RO_3M'''$, in which R is a phosphorus or a sulphur atom, preferably R being a sulphur atom, M''' represents $NH_4$, Na, Li or K and $n_2$ is an integer ranging from 2 to 5, preferably $n_2$ being equal to 3;

(d) A-$R_{bf}$-B bifunctional fluorinated surfactants, wherein A and B, equal to or different from each other, have formula $-(O)_pCFX''-COOM^*$, wherein $M^*$ represents $NH_4$, Na, Li or K, preferably $M^*$ representing $NH_4$, X'' is F or $-CF_3$ and p is an integer equal to 0 or 1, and $R_{bf}$ is a divalent (per)fluoroalkyl or (per)fluoropolyether chain such that the number average molecular weight of A-$R_{bf}$-B is in the range of from 300 to 1800; and (e) mixtures thereof.

Preferred surfactants (FS) suitable for use in the process of the invention comply with formula (b) as described above.

The polymerization process of the invention typically results in an aqueous latex comprising the polymer (F) as defined above and at least one fluorinated surfactant [surfactant (FS)] as defined above.

The amount of polymer (F) as defined above in the latex directly resulting from the polymerization process typically ranges between 10% and 40% by weight, preferably between 20% and 30% by weight.

The polymer (F) as defined above is dispersed in the latex under the form of particles having an average size typically ranging between 50 and 200 nm, preferably between 60 and 150 nm, more preferably between 80 and 125 nm, as measured according to ISO 13321.

A composition comprising the polymer (F) as defined above and at least one fluorinated surfactant (FS) as defined above may be isolated by coagulation from the aqueous latex as defined above, if a polymer in solid form is desired.

The Applicant has found that a solid composition comprising the polymer (F) as defined above and at least one surfactant (FS) as defined above, wherein said surfactant (FS) is present in an amount of advantageously less than 100 ppm, preferably of less than 50 ppm, more preferably of less than 10 ppm, may be successfully obtained by thermal treating the composition resulting from coagulation of the aqueous latex as defined above.

The thermal treatment is typically performed in suitable heating devices, generally electric ovens or convection ovens. The thermal treatment is carried out at temperatures typically up to 300° C., preferably up to 200° C., more preferably up to 100° C. The thermal treatment is carried out for a time of typically from 1 to 60 hours, preferably of from 10 to 50 hours.

The polymerization process of the invention may be used to produce melt-processable fluoropolymers. The polymerization process can further yield fluoropolymers which can be cured to make fluoroelastomers as well as fluorothermoplasts. Fluorothermoplasts are generally fluoropolymers which have a distinct and well noticeable melting point, typically in the range between 60° C. and 320° C. or between 100° C. and 320° C. They thus have a substantial crystalline phase. Fluoropolymers which are used for making fluoroelastomers are typically amorphous and/or have a neglectable amount of crystallinity such that no or hardly any melting points is discernable for these fluoropolymers.

Another object of the present invention is a composition (C) comprising the polymer (F) as defined above and at least one VDF polymer different from polymer (F).

The term "VDF polymer" is hereby intended to denote a polymer comprising at least 70% by moles of recurring units derived from vinylidene fluoride (VDF) and, optionally, up to 30% by moles of recurring units derived from at least one other suitable fluorinated comonomer (F) as defined above.

VDF homopolymer is particularly advantageous for the composition (C) of the present invention.

The composition (C) advantageously comprises at least 5% by weight, preferably at least 10% by weight of polymer (F).

Still, another object of the present invention is use of the polymer (F) as defined above or of the composition (C) as defined above as binder, especially for forming electrodes such as electrodes of Lithium batteries and/or electric double layer capacitors.

The use as binder as detailed above will be described in relation with polymer (F); it is nevertheless understood that the composition (C) as detailed above can be used in lieu of polymer (F) in all the embodiments detailed here below.

When using the polymer (F) as a binder, a binder solution of polymer (F) is generally prepared.

The organic solvent used for dissolving the polymer (F) to provide the binder solution according to the present invention may preferably be a polar one, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. As the vinylidene fluoride polymer used in the present invention has a much larger polymerization degree than a conventional one, it is further preferred to use a nitrogen-containing organic solvent having a larger dissolving power, such as N-methyl-2-pyrrolidone, N,N-dimethylformamide or N,N-dimethylacetamide among the above-mentioned organic solvents. These organic solvents may be used singly or in mixture of two or more species.

For obtaining the binder solution of polymer (F) as defined above, it is preferred to dissolve 0.1-10 wt. parts, particularly 1-5 wt. parts, of the polymer (F) in 100 wt. parts of such an organic solvent. Below 0.1 wt. part, the polymer occupies too small a proportion in the solution, thus being liable to fail in exhibiting its performance of binding the powdery electrode material. Above 10 wt. parts, an abnormally high viscosity of the solution is obtained, so that not only the preparation of the electrode-forming composition becomes difficult but also avoiding gelling phenomena can be an issue.

The Applicant has found that uniform dissolution of the polymer (F) as defined above in one or more organic solvents is successfully achieved at temperatures typically ranging between 20° C. and 250° C., preferably between 25° C. and 200° C., during a time typically ranging between 5 and 30 minutes, preferably between 10 and 30 minutes.

An electrode-forming composition may be obtained by adding and dispersing a powdery electrode material (an active substance for a battery or an electric double layer capacitor), and optional additives, such as an electroconductivity-imparting additive and/or a viscosity modifying agent, into the thus-obtained polymer (F) binder solution.

Also, another object of the present invention is thus an electrode-forming composition comprising polymer (F) or composition (C) as defined above, a powdery electrode material and, optionally, an electroconductivity-imparting additive and/or a viscosity modifying agent.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

As an alternative, still in the case of forming a positive electrode for a lithium ion battery, the active substance may comprise a lithiated or partially lithiated transition metal oxyanion-based electrode materials of the nominal formula $AB(XO_4)_fE_{1-f}$, in which A is lithium, which may be partially substituted by another alkali metal representing less that 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1 (extremes included).

The above $AB(XO_4)_fE_{1-f}$ active substances are preferably phosphate-based and may have an ordered or modified olivine structure.

More preferably, the active substance as above described complies with formula $Li_{3-x}M'_yM''_{2-y}(XO_4)_3$ in which: 0≤x≤3, 0≤y≤2; M' and M" are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which 0≤x≤1, wherein x is preferably 1 (that is to say, Lithium Iron Phosphate of formula: $LiFePO_4$).

In the case of forming a negative electrode for a lithium battery, the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 μm.

An electroconductivity-imparting additive may be added in order to improve the conductivity of a resultant composite electrode layer formed by applying and drying of the electrode-forming composition of the present invention, particularly in case of using an active substance, such as $LiCoO_2$ or $LiFePO_4$, showing a limited electron-conductivity. Examples thereof may include: carbonaceous materials, such as carbon black, graphite fine powder and fiber, and fine powder and fiber of metals, such as nickel and aluminum.

The active substance for an electric double layer capacitor may preferably comprise fine particles or fiber, such as activated carbon, activated carbon fiber, silica or alumina particles, having an average particle (or fiber) diameter of 0.05-100 μm and a specific surface area of 100-3000 $m^2/g$, i.e., having a relatively small particle (or fiber) diameter and a relatively large specific surface area compared with those of active substances for batteries.

The preferred electrode-forming composition for positive electrodes comprises:
(a) polymer (F), in an amount from 1% to 10% by weight, preferably from 2% to 9% by weight, more preferably about 3% by weight, with respect to the total weight (a)+(b)+(c);
(b) carbon black as electroconductivity-imparting additive, in an amount from 2% to 10% by weight, preferably from 4% to 6% by weight, more preferably about 5% by weight, with respect to the total weight (a)+(b)+(c);
(c) a powdery electrode material, preferably a composite metal chalcogenide represented by a general formula of $LiMY_2$, as above detailed, or a lithiated or partially lithiated transition metal oxyanion-based electrode materials of the nominal formula $AB(XO_4)_fE_{1-f}$, as above detailed, in an amount from 80% to 97% by weight, preferably from 85% to 94% by weight, more preferably about 92% by weight.

Further, another object of the present invention is use of the polymer (F) or of composition (C) as defined above for the manufacture of a hydrophilic membrane.

The present invention thus pertains to a process for the manufacture of a hydrophilic membrane comprising polymer (F) or composition (C) as defined above, and to the hydrophilic membrane comprising polymer (F) or composition (C) as defined above.

Above detailed use for the manufacture of hydrophilic membrane, process and membrane therefrom will be described in detail in relation with polymer (F); it is nevertheless understood that the composition (C) as defined above can be used in lieu of polymer (F) in all the embodiments detailed here below.

To the purpose of the invention the term "membrane" possesses its usual meaning, that is to say it refers, in essence, to a discrete, generally thin, interface that moderates the permeation of chemical species in contact with it. This interface may be molecularly homogeneous, that is, completely uniform in structure (dense membrane), or it may be chemically or physically heterogeneous, for example containing voids, holes or pores of finite dimensions (porous membrane). The terms "pore", "void" and "hole" will be used as synonymous within the context of the present invention.

The membrane of the invention is preferably a porous membrane. A porous membrane possesses generally a voided structure with interconnected pores.

Porous membranes are generally characterized by the average pore diameter (d) and the porosity (ε), i.e. the fraction of the total membrane that is porous.

The porous membrane of the invention has a porosity (ε) of advantageously at least 1%, preferably of at least 2%, more preferably of at least 3% and advantageously of at most 90%, preferably of at most 80%.

These pores have generally an average diameter (d) of advantageously at least 0.01 μm, preferably of at least 0.05

μm, more preferably of at least 0.1 μm and advantageously of at most 50 μm, preferably of at most 25 μm, more preferably of at most 10 μm.

The membrane can be under the form of a flat-sheet or can be produced under the form of thin tubes or fibers (hollow-fiber membranes). Flat-sheet membranes are generally preferred when high fluxes are required. Formation of membrane into hollow fibers is particularly advantageous when compact modules with high surface areas are required.

The membranes of the invention can be used in the chemical processing industry in various separation processes, such as microfiltration and preferably ultrafiltration, in particular of aqueous media, and in biomedical applications, e.g. for haemodialysis, for controlled release of drugs, for artificial organs, such as kidney, lung and pancreas.

The skilled in the art is aware of suitable standard technique which will enable him to process the polymer (F) of the present invention to obtain the membrane having the porosity and the average pore diameter required.

Should the membrane be a dense membrane, the process of the invention advantageously comprises casting and/or melt forming the polymer (F) as defined above.

Melt forming is commonly used to make dense membranes either by extrusion as a sheet from a die or as a blown film.

Should the membrane be a porous membrane, the process of the invention advantageously comprises at least one step including one of irradiation technique, film expansion, template leaching technique, solution precipitation technique.

According to the irradiation technique, a film of the polymer (F) as defined above made by conventional techniques is first irradiated with charged particles from a suitable radiation source, said particles typically breaking polymer chains and leaving sensitized/damaged tracks; then said irradiated film is passed through a suitable etch solution etching preferentially along the sensitized tracks, thereby forming pores.

In the film expansion, porous membranes are prepared by subsequent orientation and stretching; thus an oriented film of the polymer (F) as defined above is typically extruded under drawdown; after cooling, the film is advantageously stretched at right angle to the original orientation, so that the crystalline structure of the polymer is typically deformed and slit-like voids are advantageously formed.

According to the template leaching technique, a homogeneous film is prepared from a mixture of the membrane material (i.e. the polymer (F) as defined above) and a leachable component. After the film has been formed, the leachable component is removed with a suitable solvent and a porous membrane is formed. The leachable component could be a soluble low molecular weight solid or liquid, such as a plasticizer, a low molecular weight VDF polymer, and the like.

In the solution precipitation technique, a clear solution comprising the polymer (F) as defined above is precipitated into two phases, namely a solid, polymer-rich phase which forms the matrix of the membrane and a liquid, polymer-poor phase that forms the membrane pores. Said polymer precipitation from solution can be achieved in several ways, such as cooling, solvent evaporation, precipitation by immersion in a non-solvent, imbibition of a non-solvent from the vapour phase.

Casting generally involves solution casting, wherein typically a casting knife or draw-down bar is used to spread an even film of an appropriate polymer solution of the polymer (F) as defined above across a suitable support. After the casting has been made, the solvent generally evaporates to leave a uniform dense membrane.

According to a preferred embodiment of the invention, the process comprises at least one step including template leaching technique.

According to this preferred embodiment of the invention, 100 wt. parts of a thermoplastic composition (TC) comprising polymer (F) as defined above is mixed with 50-250 wt. parts of a plasticizer and, optionally, 0-80 wt. parts of a good solvent for said polymer (F) to provide a mixture (Mx); said mixture (Mx) is processed into a film; the film is then subjected to extraction of the plasticizer (and optionally of the good solvent) by a suitable extraction solvent.

As the plasticizer, hydrogenated plasticizers may be preferably used. Esters or polyesters such as citrates, phthalates, trimellitates, sabacates, adipates, azelates can be notably mentioned. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; azelaic acid-based polyesters of e.g., the azelaic acid-propylene glycol type, and azelaic acid-1,3-butylene glycol type; alkyl phthalates like, e.g. di(2-ethyl hexyl) phthalate, diisononyl phthalate, diisodecyl phthalate; alkyl and acyl citrates, e.g. triethyl citrate, acetyl triethyl citrate, tri-n-butyl citrate, acetyl-tri-n-butyl citrate, trioctyl citrate, acetyl-tri-octyl citrate trihexyl citrate, acetyl-trihexyl citrate, butyryl-trihexyl citrate or trihexyl-o-butyryl citrate; alkyl trimelliltates, like notably trimethyl trimellitate, tri-(2-ethylhexyl)trimellitate, tri-(n-octyl,n-decyl)trimellitate tri-(heptyl,nonyl)trimellitate, n-octyl trimellitate.

As the good solvent for polymer (F), those capable of dissolving polymer (F) in a temperature range of 20-250° C. may be used. Examples thereof may include: N-methylpyrrolidone, N,N-dimethylformamide, N,N-dimethylacetamide, dimethyl sulfoxide, methyl ethyl ketone, acetone, tetrehydrofuran, dioxane, ethyl acetate, propylene carbonate, cyclohexane, methyl isobutyl ketone, dimethyl phthalate, and solvent mixtures of these. N-methylpyrrolidone (NMP) is particularly preferred in view of its stability at high temperatures.

A good solvent for polymer (F) is particularly advantageous when the mixture (Mx) is processed by casting, as it can advantageously help in tuning the viscosity of said mixture (Mx).

The so obtained mixture (Mx) can be processed by extrusion moulding, injection moulding, compression moulding and/or casting to yield a film, so as to obtain advantageously the desired shape to the membrane.

Then the so obtained film is dipped into an extraction solvent to extract the plasticizer and optionally the good solvent. It is possible to carry out the extraction at room temperature obtaining a complete plasticizer extraction in a time ranging from some minutes to some hours, depending on the thickness, the nature of the extraction solvent and the agitation. Generally times of few minutes are sufficient to completely extract the plasticizer. After extraction a porous membrane is obtained.

As extraction solvents, solvents wherein the plasticizer is soluble, but which are not compatible with the polymer (F), so as not to cause the swelling thereof, are generally used.

The most commonly used class of solvents is that of aliphatic alcohols, preferably having a short chain, for example from 1 to 6 carbon atoms, more preferably methanol and isopropanol.

It is also understood that the polymer (F) can be used for the manufacture of a hydrophilic membrane either alone, as unique thermoplastic polymer component or in admixture with another suitable thermoplastic polymer.

Particularly advantageous to the purposes of the invention is a composition comprising polymer (F) and at least one VDF polymer, i.e. the composition (C) of the invention as defined above.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Determination of Fluoropolymer Chain Ends

Fluoropolymer chain ends were determined according to the method described in PIANCA, M., et al. End groups in fluoropolymers. *Journal of Fluorine Chemistry* 1999, vol. 95, p. 71-84. Concentration of relevant chain ends are expressed as mmoles per kg of VDF recurring units.

Determination of Intrinsic Viscosity

Intrinsic viscosity [η] was determined using the following equation on the basis of the dropping time, at 25° C., of a solution obtained by dissolving fluoropolymer in dimethylformamide at a concentration of about 0.2 g/dl, in an Ubbelhode viscosimeter:

$$[\eta] = \frac{\eta_{sp} + \Gamma \cdot \ln\eta_r}{(1+\Gamma)\cdot c}$$

where:
c is fluoropolymer concentration in g/dl;
$\eta_r$ is the relative viscosity, i.e. the ratio between the dropping time of sample solution and the dropping time of solvent;
$\eta_{sp}$ is the specific viscosity, i.e. $\eta_r - 1$;
Γ is an experimental factor, which for fluoropolymers corresponds to 3.

Differential Scanning Calorimetry (DSC) Analyses

DSC analyses were carried out according to ASTM D 3418 standard method. $T_{m2}$ represents the melting temperature as measured in the second heating cycle.

Determination of Total Average Monomer (MA) Content

Total average monomer (MA) content in fluoropolymers was determined by acid-base titration.

A sample of 1.0 g of fluoropolymer was dissolved in acetone at a temperature of 70° C. 5 ml of water were then added dropwise under vigorous stirring so as to avoid coagulation of the polymer. Titration with aqueous NaOH having a concentration of 0.01 N until complete neutralization of acidity was then carried out, with neutrality transition at about −170 mV.

Dissolution Tests

A sample of 2.0 g of fluoropolymer was added in five steps each of 0.4 g during 1 minute to 20 ml of anhydrous NMP under stirring (800 rpm) by means of a rod-like magnetic stirrer bar at a temperature of 30° C. Time to complete dissolution (transparent, fluid solution) was measured.

Determination of Thermal Stability

Thermal stability values were measured from thermogravimetric analysis (TGA) according to ISO 11358 standard method, under nitrogen atmosphere, in dynamic mode. Temperatures required for obtaining a weight loss of, respectively, 0.5%, 0.75% and 1% by weight of fluoropolymer were recorded. The higher these temperatures, the higher is the thermal stability of the fluoropolymer.

EXAMPLE 1

Manufacture of VDF-AA Fluoropolymer

In a 21 lt. horizontal autoclave equipped with baffles and stirrer working at 60 rpm, 15 lt. of demineralized water were introduced followed by 75 g of a microemulsion obtained as described in Example 1 of U.S. Pat. No. 7,122,608 (SOLVAY SOLEXIS S.P.A.) 17 Oct. 2006. Pressure was maintained constant at 50 absolute bar throughout the whole trial by feeding VDF. When the temperature reached set-point of 125° C., 22.5 g of di-tert-butyl peroxide (DTBP) were added. After feeding 5% of the targeted amount of VDF, the temperature was brought to 115° C. 15 ml of a 1.3% by weight aqueous solution of acrylic acid (AA) were fed every 278 g of fluoropolymer obtained; feeding was disrupted once 5550 g of VDF were fed, and pressure was let falling down to 15 absolute bar in a total time of 460 minutes. The reactor was then vented, cooled to room temperature and the latex discharged and coagulated by freezing for 48 hours. The fluoropolymer obtained was washed with demineralized water and dried at 80° C. for 16 hours.

Composition and properties of so obtained fluoropolymer are summarized in Table 1. Data regarding TGA analysis and dissolution properties are summarized in Table 2.

EXAMPLE 2

Manufacture of VDF-TrFE-CTFE-AA Fluoropolymer

In an AISI 316 steel vertical autoclave equipped with baffles and stirrer working at 570 rpm, 3.5 lt. of demineralized water were introduced. When the temperature reached set-point of 120° C., 32.5 g of a microemulsion obtained as described in Example 1 of U.S. Pat. No. 7,122,608 (SOLVAY SOLEXIS S.P.A.) 17 Oct. 2006 were introduced in the reactor together with 6.1 absolute bar of VDF and 0.4 absolute bar of CTFE. A gaseous mixture of VDF-TrFE-CTFE (64/29/7% by moles) was then fed until reaching a pressure of 30 absolute bar.

Gas phase, before starting polymerization, was shown by GC analysis to possess the following composition (% by moles): 82.7% VDF, 12.8% TrFE, 4.5% CTFE.

12 ml of di-tert-butyl peroxide (DTBP) and 2 ml of a 1% by volume aqueous solution of acrylic acid (AA) were thus fed for initiating reaction. The polymerization pressure was maintained by continuously feeding above mentioned monomers mixture. After feeding 2% of the targeted amount of mixture, 2 ml of a 1% by volume aqueous solution of acrylic acid (AA) was fed every 29 g of fluoropolymer obtained; feeding was disrupted once 587 g of the monomeric mixture were fed, and pressure was let falling down to 15 absolute bar in a total time of 335 minutes. The reactor was then vented, cooled to room temperature and the latex discharged and coagulated by freezing for 48 hours. The fluoropolymer obtained was washed with demineralized water and dried at 80° C. for 48 hours.

Composition and properties of so obtained fluoropolymer are summarized in Table 1. Data regarding TGA analysis and dissolution properties are summarized in Table 2.

COMPARATIVE EXAMPLE 1

Manufacture of VDF-TrFE-CTFE-AA Fluoropolymer

Same procedure as detailed in Example 2 was followed, but:

5.8 absolute bar of VDF and 0.5 absolute bar of CTFE were fed;

a gaseous mixture of VDF-TrFE-CTFE (63/29/8% by moles) was fed;

10 ml of a 1% by weight aqueous solution of ammonium persulfate were fed every 29 g of polymer obtained.

Gas phase, before starting polymerization, was shown by GC analysis to possess the following composition (% by moles): 67.8% VDF, 20.6% TrFE, 11.6% CTFE.

After conversion of 587 g of the monomeric mixture, pressure was let falling down to 15 absolute bar in a total time of 203 minutes.

Composition and properties of so obtained fluoropolymer are summarized in Table 1. Data regarding TGA analysis and dissolution properties are summarized in Table 2.

Relevant properties of fluoropolymers obtained as detailed hereinabove are summarized in Table 1 here below:

TABLE 1

| | Run | | |
|---|---|---|---|
| | Ex. 1 | Ex. 2 | C. Ex. 1 |
| VDF [% mol] | 99.95% | 65.96% | 66.56% |
| TrFE [% mol] | — | 27.98% | 27.98% |
| CTFE [% mol] | — | 6.00% | 5.40% |
| AA [% mol] | 0.05% | 0.06% | 0.06% |
| Total chain ends [mmol/kg of VDF] | 140 | 104 | 25 |
| Intrinsic viscosity [dl/g] | 1.4 | 0.75 | 1.25 |
| $T_{m2}$ [° C.] | 157.0 | 123.3 | 121.6 |

As shown in Table 2 here below, the fluoropolymers obtained according to Examples 1 and 2 of the invention successfully exhibited enhanced dissolution properties as compared with the fluoropolymers obtained according to comparative Example 1, wherein the amount of end groups having formula —$CF_2H$ and/or —$CF_2CH_3$ is less than 30 mmoles/Kg of VDF recurring units.

Also, the fluoropolymers obtained according to Examples 1 and 2 of the invention were found to be endowed with very good or enhanced thermal stability values as compared with fluoropolymers obtained according to comparative Example 1.

TABLE 2

| | Dissolution time | Thermal stability [° C.] | | |
|---|---|---|---|---|
| Run | [min] | 0.5% | 0.75% | 1.0% |
| Ex. 1 | 15 | 397° C. | 417° C. | 426° C. |
| Ex. 2 | 15 | 377° C. | 386° C. | 391° C. |
| C. Ex. 1 | >30 | 380° C. | 388° C. | 394° C. |

The fluoropolymers (F) of the invention were found to be suitable, even at low levels of (meth)acrylic monomer (MA) in the composition, for being advantageously processed via organic solvent solutions for the manufacture of electrodes and membranes.

The invention claimed is:

1. A fluoropolymer comprising:
recurring units derived from vinylidene fluoride (VDF), and
from 0.01% to 5% by moles of recurring units derived from at least one (meth)acrylic monomer (MA) having formula (I):

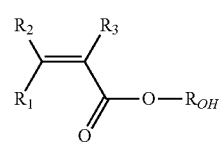

wherein:
$R_1$, $R_2$ and $R_3$, equal to or different from each other, are independently selected from the group consisting a hydrogen atom and a $C_1$-$C_3$ hydrocarbon group, and
$R_{OH}$ represents a hydrogen atom or a $C_1$-$C_5$ hydrocarbon moiety comprising at least one hydroxyl group,
and wherein said fluoropolymer comprises end groups having formula —$CF_2H$ and/or —$CF_2CH_3$ in an amount of at least 30 mmoles per Kg of vinylidene fluoride (VDF) recurring units.

2. The fluoropolymer of claim 1, wherein the (meth)acrylic monomer (MA) is acrylic acid (AA) or hydroxyethylacrylate (HEA).

3. The fluoropolymer of claim 1, comprising at least 0.02% by moles of recurring units derived from said at least one (meth)acrylic monomer (MA) having said formula (I).

4. The fluoropolymer of claim 1, comprising at most 1% by moles of recurring units derived from said at least one (meth)acrylic monomer (MA) having said formula (I).

5. The fluoropolymer of claim 1, further comprising recurring units derived from one or more other fluorinated comonomers (F).

6. A process for the manufacture of the fluoropolymer of claim 1, said process comprising polymerizing, at a pressure of from 20 to 70 bar and a temperature of from 60° C. to 135° C., said vinylidene fluoride (VDF), said at least one (meth)acrylic monomer (MA) having said formula (I) and, optionally, one or more other fluorinated comonomers (F), in the presence of at least one radical initiator in a polymerization medium comprising:
water;
at least one fluorinated surfactant (FS); and
at least one non-functional perfluoropolyether (PFPE) oil.

7. An aqueous latex comprising the fluoropolymer of claim 1 and at least one fluorinated surfactant (FS).

8. A composition (C) comprising the fluoropolymer of claim 1 and at least one VDF polymer different from said fluoropolymer.

9. A method for forming electrodes comprising the step of using the fluoropolymer of claim 1 or a composition comprising said fluoropolymer and at least one VDF polymer different from said fluoropolymer as binder.

10. An electrode-forming composition comprising the fluoropolymer of claim 1 or a composition comprising said fluoropolymer and at least one VDF polymer different from said fluoropolymer, a powdery electrode material and, optionally, an electroconductivity-imparting additive and/or a viscosity modifying agent.

11. A hydrophilic membrane comprising the fluoropolymer of claim 1 or a composition comprising said fluoropolymer and at least one VDF polymer different from said fluoropolymer.

12. The process of claim 6, wherein the radical initiator is at least one organic radical initiator selected from the group consisting of di-tert-butyl peroxide (DTBP), diterbutylperoxyisopropylcarbonate, terbutyl(2- ethyl-hexyl)peroxycarbonate and terbutylperoxy-3,5,5-trim ethylhexanoate.

13. The process of claim 6, wherein the radical initiator is a mixture of one or more organic radical initiators and one or more inorganic radical initiators.

14. The process of claim 6, wherein the polymerizing is carried out at a pressure of from 25 to 65 bar.

15. The process of claim 6, wherein the polymerizing is carried out at a temperature of from 90° C. to 130° C.

* * * * *